United States Patent
Arora et al.

(10) Patent No.: US 10,917,393 B2
(45) Date of Patent: *Feb. 9, 2021

(54) REMOTE MONITORING AND MANAGEMENT OF AN INSTANT ISSUANCE SYSTEM

(71) Applicant: ENTRUST CORPORATION, Shakopee, MN (US)

(72) Inventors: Vishal Arora, Maple Grove, MN (US); Scott Kullman, Chanhassen, MN (US); Kent Landerholm, Apple Valley, MN (US); Tim Zurn, Prior Lake, MN (US); Jon Wittmayer, Inver Grove Heights, MN (US); Benoit Lemercier, Savage, MN (US); Jeffrey Davison, Eden Prairie, MN (US); Daniel A. Sanden, Plymouth, MN (US)

(73) Assignee: Entrust Corporation, Shakopee, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/782,679

(22) Filed: Feb. 5, 2020

(65) Prior Publication Data

US 2020/0177559 A1   Jun. 4, 2020

Related U.S. Application Data (63) Continuation of application No. 16/371,920, filed on Apr. 1, 2019, now Pat. No. 10,560,438, which is a (Continued)

(51) Int. Cl.
*H04L 29/06* (2006.01)
*G06F 8/65* (2018.01)
*G06Q 20/34* (2012.01)

(52) U.S. Cl.
CPC ............ *H04L 63/0428* (2013.01); *G06F 8/65* (2013.01); *G06Q 20/34* (2013.01); *G06Q 20/355* (2013.01);
(Continued)

(58) Field of Classification Search
CPC .................................................. H04L 63/0428
See application file for complete search history.

(56) References Cited

U.S. PATENT DOCUMENTS

| 5,266,781 A | 11/1993 | Warwick et al. |
| 5,367,362 A | 11/1994 | Forest |

(Continued)

FOREIGN PATENT DOCUMENTS

| JP | 2001014515 | 1/2001 |
| JP | 2011043869 | 3/2011 |

(Continued)

OTHER PUBLICATIONS

Extended European Search Report, European Application No. 16815392.2, dated Nov. 26, 2018 (8 pages).
(Continued)

*Primary Examiner* — Simon P Kanaan
(74) *Attorney, Agent, or Firm* — Hamre, Schumann, Mueller & Larson, P.C.

(57) ABSTRACT

A system and method for remote monitoring and management of an instant issuance system is provided. The embodiments provide secure communication between different entities within the instant issuance system. Security can be established via mutual authentication between the communicating entities of the instant issuance system prior and/or concurrent with a communication taking place.

17 Claims, 2 Drawing Sheets

Related U.S. Application Data continuation of application No. 15/192,332, filed on Jun. 24, 2016, now Pat. No. 10,284,528.

(60) Provisional application No. 62/184,665, filed on Jun. 25, 2015, provisional application No. 62/315,294, filed on Mar. 30, 2016.

(52) U.S. Cl.
CPC ........ *H04L 63/0869* (2013.01); *H04L 63/166* (2013.01)

(56) References Cited

U.S. PATENT DOCUMENTS

| | | |
|---|---|---|
| 5,569,897 A | 10/1996 | Masuda |
| 5,710,637 A | 1/1998 | Matsumoto |
| 5,746,451 A | 5/1998 | Weyer |
| 5,863,076 A | 1/1999 | Warther |
| 5,883,452 A | 3/1999 | Masuda |
| 5,889,941 A | 3/1999 | Tushie et al. |
| 5,940,811 A | 8/1999 | Norris |
| 6,014,748 A | 1/2000 | Tushie et al. |
| 6,134,614 A | 10/2000 | Chari et al. |
| 6,144,948 A | 11/2000 | Walker et al. |
| 6,196,459 B1 | 3/2001 | Goman et al. |
| 6,335,799 B1 | 1/2002 | Provost |
| 6,363,164 B1 | 3/2002 | Jones et al. |
| RE38,295 E | 11/2003 | Kobayashi et al. |
| 6,877,656 B1 | 4/2005 | Jaros et al. |
| 6,997,629 B2 | 2/2006 | Bungert et al. |
| 7,191,938 B2 | 3/2007 | Pittroff |
| 7,404,516 B2 | 7/2008 | McGee et al. |
| 7,806,338 B1 | 10/2010 | Behner et al. |
| 8,056,816 B2 | 11/2011 | Behner et al. |
| 8,292,167 B2 | 10/2012 | Behner et al. |
| 9,335,958 B2 | 5/2016 | Anno et al. |
| 2002/0138438 A1 | 9/2002 | Bardwell |
| 2003/0002066 A1 | 1/2003 | Miyano |
| 2003/0006901 A1 | 1/2003 | Kim et al. |
| 2003/0090712 A1 | 5/2003 | Lenz et al. |
| 2004/0099730 A1 | 5/2004 | Tuchler et al. |
| 2004/0188023 A1 | 9/2004 | Sasaki et al. |
| 2005/0167487 A1 | 8/2005 | Conlon et al. |
| 2005/0173520 A1 | 8/2005 | Jaros et al. |
| 2005/0236473 A1 | 10/2005 | Lenz et al. |
| 2006/0190332 A1 | 8/2006 | Grider |
| 2006/0259189 A1 | 11/2006 | Perlow et al. |
| 2006/0290967 A1 | 12/2006 | Sumitomo et al. |
| 2007/0034689 A1 | 2/2007 | Jaros et al. |
| 2007/0215699 A1 | 9/2007 | Arego et al. |
| 2009/0219574 A1 | 9/2009 | Cameron et al. |
| 2010/0027054 A1 | 2/2010 | Reddy et al. |
| 2011/0000386 A1 | 1/2011 | Behner et al. |
| 2011/0144793 A1 | 6/2011 | Elgar et al. |
| 2013/0003104 A1* | 1/2013 | DeFore ................ G06F 3/1271 358/1.14 |
| 2013/0067216 A1* | 3/2013 | Tanner ................ G06Q 20/354 713/155 |
| 2014/0084071 A1 | 3/2014 | Einman et al. |
| 2014/0291395 A1 | 10/2014 | Wankmueller et al. |

FOREIGN PATENT DOCUMENTS

| | | |
|---|---|---|
| KR | 20050089116 | 9/2005 |
| KR | 20080009364 | 1/2008 |
| WO | 9829829 | 9/1998 |
| WO | 2005024699 | 3/2005 |
| WO | 2006018636 | 2/2006 |

OTHER PUBLICATIONS

International Search Report and Written Opinion, International Patent Application No. PCT/US2016/039290, dated Sep. 27, 2016 (14 pages).
International Search Report and Written Opinion for PCT/US2008/071923, dated Nov. 3, 2008, 12 pages.
"Spool," Microsoft Computer Dictionary 3rd Edition, Microsoft Press, 1997, p. 446.
Sales brochure entitled: "MCAT: MAG-TEK Card Activating Terminal," 1995, p. 1-6.
Sales brochure entitled: "HI-CO MCAT: Virtually Unerasable Bank Card Encoding . . . ," 1996, p. 1-2.
International Search Report for PCT/US2011/043336, dated Jun. 21, 2012, 3 pages.
Written Opinion for PCT/US2011/043336, dated Jun. 21, 2012, 4 pages.
Sales brochure entitled: "Xpressi Remote & Branch Issuance Solution," NBS Technologies, Inc., Feb. 2009, 2 pages.

* cited by examiner

REMOTE MONITORING AND MANAGEMENT OF AN INSTANT ISSUANCE SYSTEM

FIELD

This disclosure relates generally to issuance of personalization cards. More particularly, this description relates to a method and system for providing remote monitoring and management of an instant issuance system.

BACKGROUND

Many new customer accounts opened by banks include one or more debit or credit cards associated with the account. New customer accounts are typically opened at branch locations whereas new cards are often issued by a centralized card services provider that is not physically near the bank branch. The card services provider fulfills the card request by printing and encoding the card, then mailing it, to the branch or to the customer. The customer must then activate the card. This process involves delay and expense that is undesirable and may introduce unnecessary security risks.

SUMMARY

This application is directed to a method and system for providing remote monitoring and management of an instant issuance system.

In particular, the embodiments described herein can allow the instant issuance system to monitor and manage operational parameters of one or more entities of the instant issuance system. The operational parameters can include, for example, ribbon or other supply level(s), cardstock supply, printer type, printer status, printer or other device location, IP address, certificate status, firmware version, security pin pad status, camera status, soft systems methodology (SSM) status, software status, etc. for each entity.

Also, the embodiments described herein can provide secure communication between different entities within the instant issuance system. Security can be established via mutual authentication between the communicating entities of the instant issuance system prior and/or concurrent with a communication taking place. Mutual authentication, as described herein, can be provided at the transport layer and/or the application layer under the Open Systems Interconnection (OSI) model. Security can also be provided to encrypt application specific data communicated between entities of the instant issuance system.

In one embodiment, an instant issuance system for issuing a customized personalization card is provided. The system includes an instant issuance server component, a customized personalization card printer and a remote monitoring and management (RMM) server component. The instant issuance server component is configured to process received customized issuance information and generate printer information to be placed on the customized personalization card. The customized personalization card printer is configured to place printer information received from the instant issuance server component on the customized personalization card. The RMM server component is configured to request operational data from at least one of the instant issuance server component and the customized personalization card printer, to analyze the requested operational data, to determine an operational action, and to perform the operational action. The instant issuance system is configured to provide mutual authentication for communication between the RMM server component and the customized personalization card printer, and between the instant issuance server component and the customized personalization card printer.

In another embodiment, a method for remote monitoring and management of an instant issuance system is provided. The instant issuance system includes a customized personalization card printer, an instant issuance server component and a RMM server component. The method includes performing mutual authentication between the RMM server component and a first entity, the first entity being at least one of the customized personalization card printer and the instant issuance server component. The method also includes the RMM server component sending a status request to the first entity. Also, the method includes the first entity gathering requested status information and sending the status information to the RMM server component. Further, the method includes the RMM server component analyzing the requested status information and determining an operational action. The method further includes the RMM server component performing the operational action.

In further embodiments, the RMM server component can generate, monitor and/or manage certificates and/or key pairs that are used to facilitate secure communication between a card printer or terminal and an instant issuance server component.

DETAILED DESCRIPTION

This application is directed to a method and system for providing remote monitoring and management of an instant issuance system.

In particular, the embodiments described herein can allow an instant issuance system to monitor and manage operational parameters of one or more entities (e.g., a card printer) of the issuance system. The operational parameters can include, for example, ribbon or other supply level(s), cardstock supply, printer type, printer status, printer or other device location, IP address, certificate status, firmware version, security pin pad status, camera status, soft systems methodology (SSM) status, software status, etc. for each entity. The systems described herein can facilitate the monitoring and management of a plurality of, for example, card printers, which may be located at a plurality of bank branch locations, from a remote location.

The RMM server component can automatically collect information from an entire fleet of devices (e.g., card printers) and can present data on error codes, maintenance updates, device status, and supply needs on a dashboard display. This real-time snapshot enables managers and/or IT administrators to quickly identify and resolve issues remotely for individual devices, specific device groups (type, location, etc.) or the entire fleet. The real-time dashboard view also can reduce costs and downtime by enabling managers and/or IT administrators to automate both supply replenishment and service calls linked to specific error codes.

Also, the embodiments described herein can provide secure communication between different entities within the instant issuance system. Security can be established via mutual authentication between the communicating entities of the instant issuance system prior and/or concurrent with a communication taking place. Mutual authentication, as described herein, can be provided at the transport layer and/or the application layer under the OSI model. In addition, data encryption can be provided at the transport layer and/or the application layer.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It will be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

Furthermore, the embodiments described herein may be implemented by hardware, software, firmware, middleware, microcode, hardware description languages, or any combination thereof. When implemented in software, firmware, middleware or microcode, the program code or code segments to perform the necessary tasks may be stored in a machine readable medium. In addition, a processor(s) may perform the necessary tasks.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While the embodiments discussed below are directed to a financial instant issuance system, it will be appreciated that the embodiments discussed below can be applied to other types of instant issuance systems. That is, the embodiments discussed herein can be directed to an instant issuance system for driver's licenses, government identification cards/badges, passports, etc.

Figure 1:
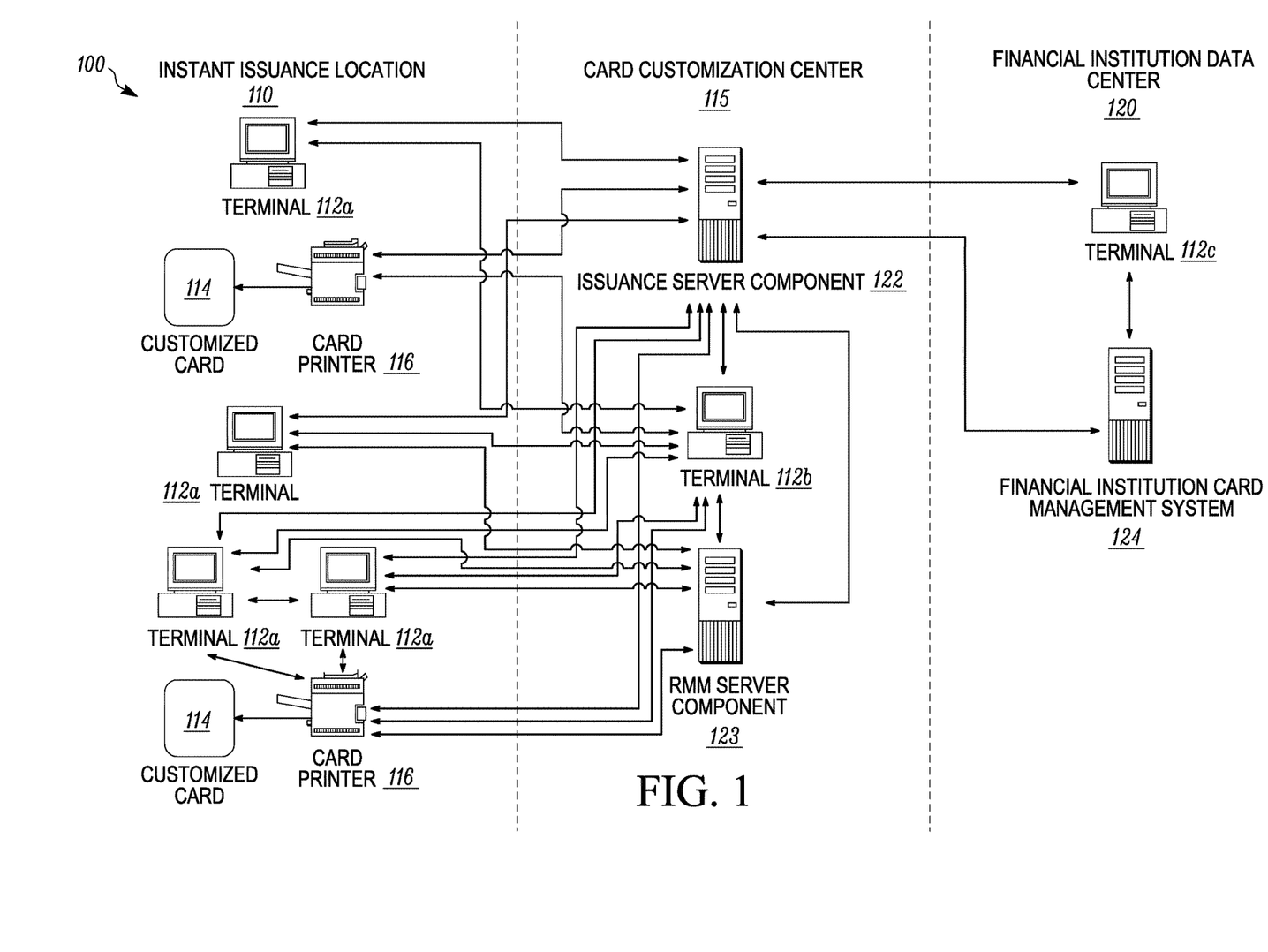
FIG. 1 illustrates a financial issuance system for issuing one or more financial personalization cards, according to one embodiment.

FIG. 1 illustrates a block diagram of a financial instant issuance system 100 for issuing a customized financial personalization card while an account holder is present. The financial instant issuance system 100 uses a remote monitoring and management system and method as described herein.

The financial instant issuance system 100 enables an account holder to receive a customized financial presentation card from a financial institution while the account holder is present. The account holder may be initializing a new account, or may already have an existing account. The customized financial personalization card may be customized with a variety of background images. The images may be chosen from an image database, or may be a personal image provided by the account holder.

A financial personalization card may be printed while the account holder is at, for example, a bank branch location, a financial self-service kiosk (SSK), etc. The account holder, or bank representative, enters his/her identification information and background selection into, for example, a terminal provided at the branch location or the financial SSK. The information is processed and transmitted to a card printer where the account holder receives his/her new customized financial personalization card.

The term "financial personalization card" refers to a card that has a stored value or credit limit and can be tied to a particular account holder. Financial personalization cards can include, but are not limited to, cards such as credit cards, debit cards, etc.

FIG. 1 is divided into three groupings including a plurality of instant issuance components 110, a card customization center 115 and a financial institution data center 120). Each of the instant issuance components 110 can include, for example, a terminal 112*a* and a card printer 116. The card customization center can include, for example, an issuance server component 122, a remote monitoring and management (RMM) server component 123, and a terminal 112*b*. The financial institution data center 120 can include, for example, a financial institution card management system (FICMS) 124 (the FICMS 124 can also be referred to as a back-end card management system 124) and a terminal 112*c*. The groupings are for representative purposes only, and may be physically located together and/or remotely located from each other. Furthermore, there may be more or less than the three representative locations. For example, two or more of the terminal(s) 112*a*, the card printer(s) 116, the issuance server component 122, the RMM server component 123, and the FICMS 124 of the financial institution data center 120 may be at the same location. Also, in some embodiments, the system 100 can include multiple instant issuance components 110 located at a single location (e.g., a bank) or located at multiple locations (e.g., multiple bank branch locations). In some embodiments, the instant issuance server component 122 can be located remotely (e.g., in separate buildings, etc.) from one or more terminal(s) 112.*a* and one or more card printer(s) 116. For example, in one embodiment, the instant issuance server component 122 can be located at bank data center location that is physically separate from a bank branch location that includes one or more terminal(s) 112*a* and/or one or more card printer(s)

116. Also, it will be appreciated that in some embodiments the issuance server component 122 and the RMM server component 123 are part of a single server machine and that in other embodiments, the issuance server component 122 and the RMM server component 123 are part of separate server machines.

The financial instant issuance system 100 is configured to provide secure communication between different entities within the instant issuance system. Security can be established via mutual authentication between the communicating entities of the instant issuance system prior and/or concurrent with a communication taking place. In particular, prior to or concurrent with any communication between a first communicating entity (e.g., one or more of the terminals 112a,b,c, the card printer 116, the issuance server component 122, the RMM server component 123 and the FICMS 124) and a second communicating entity (e.g., one or more of the terminal 112a,b,c, the card printer 116, the issuance server component 122, the RMM server component 123 and the FICMS 124), mutual authentication is established between the communicating entities.

Mutual authentication as described herein refers to the first communicating entity authenticating itself to the second communicating entity and the second communicating entity authenticating itself to the first communicating entity. In some embodiments, this can include the first communicating entity providing a digital certificate to the second communicating entity and the second communicating entity providing a digital certificate to the first communicating entity. Mutual authentication can be performed during and/or concurrent with a communication being sent from the first communicating entity to the second communicating entity. In some embodiments, each of the first and second communicating entities can include a unique digital certificate. In some embodiments, mutual authentication can be performed using a cryptographic protocol including, for example, transport layer security (TLS), secure sockets layer (SSL), Internet Protocol security (IPsec), Kerberos, etc. The mutual authentication can be provided at the transport layer and/or the application layer under the OSI model. For example, a Transport Layer Security (TLS) protocol can be used for mutual authentication and data encryption at the transport layer for transport layer security.) In some embodiments, Javascript Object Signing and Encryption (JOSE) can be used for mutual authentication and data encryption at the application layer for application layer security. In other embodiments, XML Encryption and XML Digital Signature can be used to provide application layer security.

In some embodiments, mutual authentication and/or data encryption for transport layer security and/or application layer security can be performed using asymmetric key encryption that uses, for example, a public key that may be disseminated widely and a private key known only to the owner of the private key that together form a key pair. In one example, one key pair can be used for both transport layer security and application layer security. In another example, one key pair can be used for transport layer security and another key pair can be used for application layer security.

As discussed above, each of the issuance components 110 can include one or more terminals 112a and one or more card printer(s) 116 for issuing a customized financial personalization card 114. In some embodiments, the terminal 112a and the card printer 116 can be part of a single financial SSK. In other embodiments, for example, at a bank branch location, the issuance entity component 110 can include a plurality of terminals 112a and a single card printer 116. In yet some other embodiments, for example, at a bank branch location, the instant issuance component 110 can include a single terminal 112a and a plurality of card printers 116.

The terminal 112a is configured to allow a user to customize and request production of a customized financial personalization card on demand at, for example, a bank branch. In particular, the terminal 112a is configured to display a user interface (UI) that prompts the account holder to select issuance information that will be placed on the customized financial personalization card. The issuance information may include, for example, the account holder's name and account information (e.g. account number, credit limit, etc.), a background image for the customized financial personalization card, etc. The account holder's name entered in the UI may be the name that appears on the customized financial personalization card. The background image may be selected from a database of approved background images or be an image uploaded by the account holder. Images used as a background on a presentation instrument may be required to be approved by the issuing financial institution or an association (e.g. VISA®. MasterCard®, etc).

In some embodiments; the terminal(s) 112a,b,c can be an administrative terminal that is configured to receive operation data regarding one or more operational parameters stored in the RMM server component 123. In some embodiments, the operational data can be provided in a dashboard view. For example, in one embodiment, the administrative terminal (e.g., the terminal 112a,b or c) can allow, for example, a help desk manager, an IT administrator or the like to determine the status of one or more of the other entities and when necessary take the necessary actions to ensure that the financial issuance system 100 is operating efficiently and effectively. In another embodiment, one or more of the terminals 112a can be an administrative terminal located at a particular bank branch location and/or the terminal 112b can be an administrative terminal located at the same location as the instant issuance server 122 and/or the terminal 112c can be an administrative terminal located at the same location as the FICMS 124. Accordingly, remote monitoring and management of a plurality of card printers 116 located at a plurality of bank branch locations can be achieved from a single remote location or from multiple remote locations (e.g., location of the terminal 112a and/or terminal 112b and/or the terminal 112c).

Once the issuance information from the account holder is input into the terminal 112a, the issuance information is transmitted to the issuance server component the 122. The issuance information may be transmitted over the bank network of the branch location, or over some other network. The network may be a local area network (LAN), a wide area network (WAN), the Internet, etc. The issuance server component 122 is configured to process the received information. The issuance server component 122 is configured to facilitate the production of a customized financial personalization card on demand at, for example, a bank branch. In one embodiment, the issuance server component 122 may include CardWizard® software. Server components that can be used in conjunction with the embodiments provided herein are disclosed in U.S. Pat. Nos. 7,191,938; 7,806,338; 8,056,816; and 8,292,167 and US Publication No. 2013/0003104 each of which is incorporated by reference in its entirety. The processing may include checking the received information for mistakes and inaccuracies. The processing may also include checking the account holder's name and account information against a database to verify the existence of the account. Once the issuance server component 122 completes processing the received information, the issuance server component 122 is configured to transmit the process information to the FICMS 124.

The FICMS 124 can be configured to generate a personal account number (PAN) and an expiration date of the customized financial personalization card. The FICMS 124 can also be configured to determine, for example, whether an image provided by the account holder is approved by the financial institution. The FICMS 124 then transmits the PAN and the expiration date back to the issuance server component 122.

Based on the received PAN and expiration date, the issuance server component 122 can be configured to calculate a card verification value (CVV), a card verification value 2 (CVV2), and a personal identification number (PIN) offset value. The CVV and the PIN offset value may be encoded, for example, on a magnetic stripe 330 of the customized financial personalization card. The CVV, the PIN offset value, and the CVV2 may be used to verify the authenticity of the customized financial personalization card. Specifically, the CVV2 may be used by merchants to verify presentation instrument authenticity when the merchant does not have physical access to the customized financial personalization card (e.g. a purchase made over a telephone, a mail catalog order, the Internet, etc.).

The issuance server component 122 is configured to transmit the customer name, the background image, CVV, CVV2, the PIN offset value, the PAN and the expiration date to the card printer 116. In one embodiment, the card printer 116 may be a high definition presentation instrument printer/encoder.

The card printer 116 may include a dual card hopper which allows for multiple types of cards to be loaded into the card printer 116. The card printer 116 may also include a display screen. The display screen may be a liquid crystal display (LCD); however, other display types may be used. Further, the display screen may display card supply information, option settings, progress information, etc. for a current print job. The card printer 116 may also include a lamination module which provides a laminate protection on the card to protect the customized financial personalization card from wear and tear from daily use. The card printer 116 can also include an embossing module which facilitates embossing of the card surface. Suitable card printers with embossing functionality include the CE870 from Entrust Datacard Corporation of Shakopee, Minn.

The card printer 116 may be loaded with blank presentation instrument card stock. The blank cards may include the financial institution's logo and/or holograph. The blank cards may include a magnetic stripe, a financial institution logo and a signature box. In some embodiments, the blank cards may also include a smart card chip. The magnetic stripe may be used to encode the CVV and PIN offset value information. In a further embodiment, the blank cards may be covered with a printable film. The card printer 116 may use reverse film transfer to print the selected background image, PAN information, expiration date information, the CVV2, customer name information, etc. on a printable film covering the blank card. Furthermore, a name/logo and instructions may be printed on the printable film in order to personalize the customized financial personalization card. The card printer 116 may also encode account information on the customized financial personalization card. For example, the CVV and the pin offset value may be encoded on the magnetic stripe of the presentation instrument. Also, the card printer 116 can provide embossing on the customized financial personalization card.

The RMM server component 123 is configured to provide remote monitoring for the financial instant issuance system 100. The RMM server component 133 can be a background server component that can continuously poll the terminal(s) 112*a*, the card printer(s) 116 and the issuance server component 122 for operational data regarding one or more operational parameters. Also, the RMM server component 133 can analyze the received operational data and provide one or more instructions to the terminal(s) 112*a*, the card printer(s) 116 and the issuance server component 122. The operational parameters can include, for example, ribbon or other supply level(s), cardstock supply, printer type, printer status, printer or other device location, IP address, certificate status, firmware version, security pin pad status, camera status, soft systems methodology (SSM) status, software status, etc. for each entity.

The RMM server component 133 can also be configured to manage the financial instant issuance system 100. In particular, the RMM server component 133 can provide, for example, updates (e.g., firmware updates) to each of the entities (e.g., the terminal(s) 112*a-c*, the card printer(s) 116, the issuance server component 122, and the RMM server component 123). In these embodiments, the RMM server component 123 can be configured to send a particular update to all entities at the same time, to a group of entities, or one by one to each entity. The RMM server component 123 can be configured to determine whether the update is tailored to one or more particular entities and send the update to only those particular entities without sending the update to the other entities. The RMM server component 123 can be configured to adjust a timing of when an update is sent to one or more entities based on, for example, a geographic location of the entity, a time zone of where the entity is located, etc.

In some embodiments, the RMM server component 123 can activate and/or deactivate one or more of the card printer(s) 116 from a central location. The card printer(s) 116 may be password protected. The RMM server component 123 can store a password for each of the one or more card printer(s) 116 and allow a user, via the RMM server component 123, to use the password to activate the card printer(s) 116, change the password of the card printer(s) 116, and use the password to deactivate the card printer(s) 116. Activating and deactivating the card printer(s) 116 can be useful, for example, when the card printer(s) 116 is sent in for repair. Activation and deactivation via the RMM server component 123 could also provide additional security for the card printer(s) 116 by preventing use of the card printer(s) 116 when the card printer(s) 116 is improperly connected to another system.

For example, the RMM server component 123 can deactivate the card printer(s) 116 when service is required and can activate the card printer(s) 116 after service is completed. Accordingly, a repair technician can then service the card printer(s) 116 without having to enter in a password to deactivate and/or activate the card printer(s) 116.

In some embodiments, the RMM server component 123 can provide on-request activation and/or deactivation of the card printer(s) 116. For example, the RMM server component 123 can activate the card printer(s) 116 whenever a card is to be printed by the card printer(s) 116. For example, the RKM server component 123 waits for notification from the card printer(s) 116 that a print request has been received. The card printers) 116 then waits for activation from the RMM server component 123 before proceeding with the print request. In another example, the RMM server component 123 can activate the card printer(s) 116 during, for example, certain hours of the day or certain days of the week to prevent use of the card printer(s) 116 at unauthorized time periods.

The RMM server component 123 can also provide generation, distribution and/or management of the mutual authentication protocols of the financial instant issuance system 100. The mutual authentication can be provided at the transport layer and/or the application layer under the OSI model. For example, the RMM server component 123 can use the TLS protocol for mutual authentication at the transport layer for transport layer security and/or can use Javascript Object Signing and Encryption (JOSE) protocol for mutual authentication at the application layer for application layer security.

In particular, the RMM server component 123 can generate, distribute, and/or manage certificate(s) with one or more key pairs throughout the financial instant issuance system 100. Accordingly, security (mutual authentication and/or data encryption) for data communication between the issuance server component 122 and one or more devices (e.g., the card printer(s) 116, the terminal(s) 112a-c, etc.) is managed via the RMM server component 123. Thus, data (e.g., personalization data, account data, etc.) can be securely communicated between the issuance server component 122 and the one or more devices without being disclosed or corrupted. Also, security for data communication between the RMM server component 123 and one or more devices (e.g, the card printer(s) 116, the terminals) 112a-c, etc.) is managed via the RMM server component 123. Thus, data (e.g., firmware data, etc.) can be securely communicated between the RM server component 123 and the one or more devices without being detected or compromised.

In some embodiments, the RMM server component 123 can perform mutual authentication for transport layer security and/or application layer security using asymmetric key encryption that uses, for example, a public key that may be disseminated widely and a private key known only to the owner of the private key that together form a key pair. In one example, the RMM server component 123 can generate, distribute, and/or manage one key pair that can be used for both transport layer security and application layer security. In another example, the RMM server component 123 can generate, distribute, and/or manage one key pair that can be used for transport layer security and another key pair that can be used for application layer security.

Mutual authentication using a key pair for either transport layer security and/or application layer security via the RMM server component 123 is now described. A user can setup asymmetric cryptography for mutual authentication using the RMM server component 123. In one embodiment, where the user has a plurality of devices (e.g., the terminal(s) 112a-c, the card printer(s) 116, etc.) connected to the issuance server component 122 and the RMM server component 123, the user can setup the asymmetric cryptography based on the user's requirements.

For example, the user can instruct the RMM server component 123 to generate a key pair using asymmetric cryptography, in which a single key pair (public and private key) is generated that is usable for encryption and decryption by two or more of the user's devices. The user can generate their own key pair and upload the key pair to the RMM server component 123. The RMM server component 123 then sends a certified key pair (e.g., the private key and a signed certificate that includes the public key associated with the private key) to each of the user's selected devices. In some embodiments, the certified key pair can be sent in a personal information exchange format (e.g., a PKSC #12 file (.pfx file)). The RMM server component 123 is also configured to log activity of each of the user's selected devices.

In another example, the user can instruct the RMM server component 123 to generate a key pair (public and private key) using asymmetric cryptography, in which a unique key pair is generated for each of the user's selected devices. The RMM server component 123 generates random key pairs that are unique to each device being updated. Each of the unique key pairs is signed by a secondary key pair.

In some embodiments, the user generates their own certified secondary key pair and exports the secondary key pair to the RMM server component 123. In other embodiments, the RMM server component 123 generates the secondary key pair and has the secondary key pair signed. The secondary key pair can be signed by the RMM server component 123, or can be signed by an external certificate authority (CA). When the secondary key pair is signed by the external CA, the RMM server component 123 can generate a certificate signing request (CSR) that the user can then send to the CA, or the RMM server component 123 can allow the user to import a response file from the CA and verify the response file against the generated secondary key pair. The RMM server component 123 then sends a certified key pair (e.g., the private key and a signed certificate that includes the public key associated with the private key) to the particular user device. In some embodiments, the certified key pair can be sent in a personal information exchange format (e.g., a PKSC #12 file (.pfx file)). The secondary key pair remains stored in the RMM server component 123 and in some embodiments may not be sent to the particular user device. The RMM server component is also configured to log activity of the particular device.

Thus, the RMM server component 123 can be configured to send a particular update to all devices at the same time, to a selected group of devices, or one by one to each device.

In some embodiments, the RMM server component 123 can be configured to monitor an expiration date for each certified key pair sent to a device. When the RMM server component 123 determines that a certified key pair is about to expire (e.g., five days before expiration), the RMM server component 123 can automatically generate a new certified key pair or request a certified key pair from an external CA and can automatically update the device by sending a new certified key pair to the device. The RMM server component 123 can update the device with the new certified key pair, for example, during off peak hours. Once the certified key pair(s) is sent to one or more devices, secure data communication using mutual authentication can be achieved between a device and the instant issuance server component 122, between a device and the RMM server component 123, between the instant issuance server component 122 and the RMM server component 123, etc.

Accordingly, the RMM server component 123 can generate, distribute, and/or manage a certificate and/or key pair used in mutual authentication and/or data encryption for secure data communication between another server (e.g., the issuance server component 122) and one or more devices.

Figure 2:
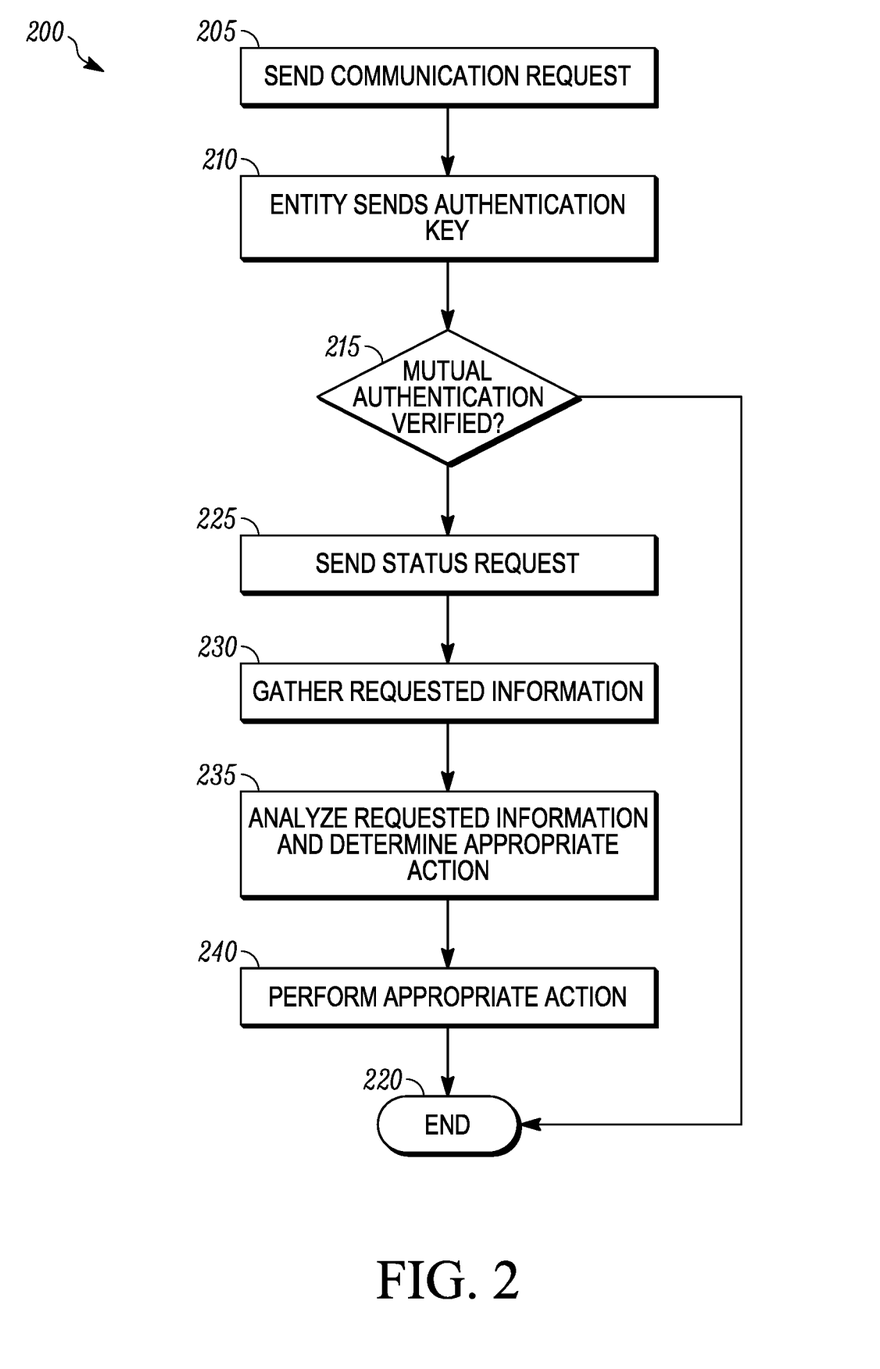
FIG. 2 illustrates a flowchart of a method for providing remote monitoring and management of a financial instant issuance system, according to one embodiment.

One embodiment of a method 200 for providing remote monitoring and management of a financial instant issuance system (e.g., the financial instant issuance system 100 shown in FIG. 1) is now described with respect to FIG. 2. At 205 a RMM server component (e.g., the RMM server component 123 shown in FIG. 1) sends a communication request to one or more entities of the financial instant issuance system. The communication request can include, for example, an authentication key (e.g., a digital certificate) for authentication by the one or more entities. In some embodiments, the authentication key can use asymmetric cryptograph that uses a public key and a private key, as discussed above. The one or more entities can include, for example, a terminal (e.g., the terminal(s) 112a-c shown in FIG. 1), a card printer (e.g., the card printer(s) 116 shown in FIG. 1), and an issuance server component (e.g., the issuance server component 122 shown in FIG. 1).

At 210, the one or more entities sends its own authentication key to the RMM server component for authentication by the RMM server component. In some embodiments, each of the one or more entities including the RMM server component includes its own unique authentication key.

At 215, the one or more entities verify the authenticity of the RMM server component and the RMM server verifies the authenticity of the one or more entities to provide mutual authentication within the financial instant issuance system. If either the one or more entities or the RMM server component cannot verify authenticity based on the received authentication key, the method 200 proceeds to 220 and ends. If both the one or more entities and the RMM server component can verify authenticity, the method 200 proceeds to 225.

At 225 the RMM server component sends a status request to one or more entities of the financial instant issuance system. The status request can include receiving operational data regarding one or more operational parameters of the one or more entities. The operational parameters can include, for example, ribbon or other supply level(s), cardstock supply, printer type, printer status, printer or other device location, IP address, certificate status, firmware version, security pin pad status, camera status, soft systems methodology (SSM) status, software status, etc. for the particular entity. The status request can also include an update status of the particular entity. In some embodiments, once mutual authentication is established, the RMM server component can continuously poll the one or more entities for a status request. In other embodiments, the RMM server component can poll the one or more entities for a status request after a time period has lapsed (e.g., every 5 minutes, every hour, every day, etc.)

At 230, the one or more entities gather the information (e.g., the operation data, the update status, etc.) requested by the RMM server component and sends the information to the RMM server component.

At 235, the RMM server component analyzes the requested information sent from the one or more entities and determines an appropriate action to take. The appropriate action can include for example, sending one or more instructions to the one or more entities to take action (e.g., issue an alarm, cease operation, begin operation, etc.). The appropriate action can also include sending an update (e.g., firmware update) for updating the configuration of the one or more entities. The appropriate action can also include providing an updated certificate to one or more entities, providing notification regarding an expired or about to expire certificate, sending an email to a system or network administrator (e.g., the terminal 112a, b, c, etc. regarding the requested information (e.g., the operational data), updating a dashboard view on an administrative terminal to reflect the current status of the system, and generating an automatic request for supply replenishment.

At 240, the RMM server component performs the appropriate action determined at 235 and the method 200 proceeds to 220 and ends.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An instant issuance system for issuing one or more customized personalization cards, the system comprising:
   a remote management and monitoring (RMM) server component configured to receive operational data from one or more customized personalization card printers that place printer information received from an instant issuance server component on the one or more customized personalization cards,
   wherein the RMM server component is configured to analyze the received operational data and configured to determine an operational action based on the received operational data, and
   wherein the RMM server component is configured to manage a plurality of certificates for one or more customized personalization card printers.

2. The instant issuance system of claim 1, wherein the RMM server component is configured to monitor an expiration date for each of the plurality of certificates, automatically generate a new certificate prior to expiration of any of the plurality of certificates, and distribute the new certificate within the instant issuance system.

3. The instant issuance system of claim 1, wherein the RMM server component is configured to generate a new key pair using asymmetric cryptography, wherein the new key pair is usable for encryption and decryption by two user devices including one of the one or more customized personalization card printers.

4. The instant issuance system of claim 1, wherein the RMM server component is configured to upload a new user generated key pair, wherein the new key pair is usable for encryption and decryption by two user devices including one of the one or more customized personalization card printers.

5. The instant issuance system of claim 1, wherein the RMM server component is configured to log activity of the RMM server component, the instant issuance server component and the one or more customized personalization card printers.

6. The instant issuance system of claim 1, wherein the instant issuance system is configured to provide encryption for application specific data communicated between one of the one or more customized personalization card printers and the RMM sever component.

7. The instant issuance system of claim 1, wherein the operational data includes information regarding a certificate status and at least one of a ribbon supply level, a cardstock supply, a printer type, a printer status, and a printer location, and
   wherein the RMM server component is configured to determine the operational action based on at least one of the ribbon supply level, the cardstock supply, the printer type, the printer status, and the printer location.

8. The instant issuance system of claim 1, wherein the RMM server component is configured to provide a firmware update to one of the one or more customized personalization card printers based on a geographic location of the one of the one or more customized personalization card printers.

9. The instant issuance system of claim 1, wherein each of the one or more customized personalization cards is one or more of a customized financial personalization card, a driver's license, a government issued card, a government issued badge, and a passport.

10. A method for remote monitoring and management of an instant issuance system that includes a remote monitoring and management (RMM) server component, the method comprising:
- the RMM server component receiving operational data from one or more customized personalization card printers that place printer information received from an instant issuance server component on one or more customized personalization cards;
- the RMM server component analyzing the received operational data;
- the RMM server component determining an operational action based on the received operational data; and
- the RMM server component managing a plurality of certificates for the one or more customized personalization card printers.

11. The method of claim 10, further comprising the RMM server component generating a new key pair using asymmetric cryptography, wherein the new key pair is usable for encryption and decryption by one of the plurality of customized personalization card printers.

12. The method of claim 10, further comprising the RMM server component uploading a new user generated key pair, wherein the new key pair is usable for encryption and decryption by one of the plurality of customized personalization card printers.

13. The method of claim 10, further comprising the RMM server component logging activity of the RMNI server component and at least one of the plurality of customized personalization card printers.

14. The method of claim 10, wherein the RMM server component is part of a single server machine with an instant issuance server component that sends printer information to at least one of the plurality of customized personalization card printers for placement on one of the one or more customized personalization cards.

15. The method of claim 10, wherein each of the one or more customized personalization cards is one or more of a customized financial personalization card, a driver's license, a government issued card, a government issued badge, and a passport.

16. The method of claim 10, further comprising:
- the RMM server component monitoring an expiration date for each of a plurality of certificates for the one or more customized personalization card printers; and
- the RMM server component distributing new certificates to the plurality of customized personalization card printers.

17. The method of claim 16, further comprising the RMM server component automatically generating one of the new certificates prior to expiration of a corresponding certificate of the plurality of certificates.

* * * * *